United States Patent [19]

Essers et al.

[11] 4,174,477
[45] Nov. 13, 1979

[54] METHOD OF AND DEVICE FOR ARC WELDING

[75] Inventors: Wilhelmus G. Essers; Gerardus Jelmorini; Gerrit W. Tichelaar, all of Eindhoven, Netherlands

[73] Assignee: U.S. Philips Corporation, New York, N.Y.

[21] Appl. No.: 799,959

[22] Filed: May 24, 1977

Related U.S. Application Data

[63] Continuation of Ser. No. 635,988, Nov. 28, 1975, abandoned, which is a continuation of Ser. No. 455,393, Mar. 27, 1974, abandoned.

[30] Foreign Application Priority Data

Apr. 9, 1973 [NL] Netherlands ............... 7304888

[51] Int. Cl.$^2$ .................................... B23K 9/00
[52] U.S. Cl. ............................. 219/121 P; 219/76.16; 219/75
[58] Field of Search ............ 219/121 R, 121 P, 74–75, 219/76, 76.16

[56] References Cited

U.S. PATENT DOCUMENTS

| | | | |
|---|---|---|---|
| 3,312,566 | 4/1967 | Wingeler | 219/121 P |
| 3,612,807 | 10/1971 | Liefkers et al. | 219/121 P |
| 3,818,175 | 6/1974 | Essers et al. | 219/121 P |
| 3,830,997 | 8/1974 | Essers et al. | 219/121 P X |
| 3,891,824 | 6/1975 | Essers et al. | 219/121 P |

FOREIGN PATENT DOCUMENTS 1901349 7/1970 Fed. Rep. of Germany ....... 219/121 P

OTHER PUBLICATIONS

"Plasma Mig Welding", sheet 46 by Essers Welding and Metal Fabrication, 12-1974.

*Primary Examiner*—Bruce A. Reynolds
*Assistant Examiner*—M. Paschall
*Attorney, Agent, or Firm*—William J. Streeter; Rolf E. Schneider

[57] ABSTRACT

A method of plasma MIG welding in which an arc is maintained between a workpiece and a welding wire in a thermally ionized gas (auxiliary plasma) which is generated by an electric gas-discharge between two non-consumable electrodes; neither the welding wire nor the workpiece acts as a single electrode for generating the thermally ionized gas.

3 Claims, 5 Drawing Figures

METHOD OF AND DEVICE FOR ARC WELDING

This is a continuation of application Ser. No. 635,988, filed Nov. 28, 1975, now abandoned, which is a continuation of Ser. No. 455,393, filed Mar. 27, 1974, now abandoned.

The invention relates to a method of and a device for arc welding, in which a primary arc is maintained between a workpiece and at least one consumable electrode in a thermally ionized gas which is generated by maintaining a secondary arc in a gas flow between at least two auxiliary electrodes.

In such a known method the secondary arc is maintained between a non-consumable electrode on the one side and a consumable electrode and/or a workpiece on the other side. Consequently, the presence of the secondary arc is dependent of the consumable electrode and/or the workpiece. This has drawbacks in given circumstances, for example, in the programmed welding of a number of workpieces in series, in which case the primary arc as well as the secondary arc have to be interrupted between successive welding cycles. In semi-automatic welding, in which the welding torch is held by hand, an accidental increase of the distance between welding torch and workpiece can cause an undesired interruption of the secondary arc.

The invention has for its object to provide a method of and a device for arc welding which do not have these drawbacks and which enable the primary arc to be struck and maintained in a simple manner without delay or disturbance in a thermally ionized gas which is generated by an electric arc which is not dependent of the presence of the workpiece and/or the consumable electrode.

This object is achieved according to the invention in that the secondary arc is maintained, independently of the primary arc, exclusively between non-consumable electrodes which act as auxiliary electrodes and which are independent of the consumable electrode and the workpiece.

This offers an arc welding process in which use is advantageously made of the thermally ionized gas, referred to hereinafter as auxiliary plasma, present any way in this welding process, for the striking of and the welding with the primary arc. Because neither the consumable electrode nor the workpiece act as an electrode for generating the plasma, the primary arc can be interrupted without interruption of the secondary arc and the plasma. The primary arc is struck by means of the plasma which is maintained by the non-interrupted secondary arc, without special steps such as a high-frequency discharge or a short-circuit contact between welding wire and workpiece being necessary. During the welding the distance between workpiece and welding torch can be varied within broad limits, in the order of 2 to 50 mm, without the primary arc being interrupted. When use is made of the method according to the invention, a number of workpieces can be successively welded with a high efficiency.

It is to be noted that for welding in a protective gas with a non-consumable electrode it is known to strike the welding arc by means of a non-transferred plasma arc. The plasma arc, normally not required in this welding process, must then be additionally generated by special means. Moreover, the plasma arc must then be switched on each time the welding arc is struck.

In a preferred embodiment of the method according to the invention, the ionized gas is concentrically guided around the end of the consumable electrode. It is thus achieved that the end of the consumable electrode is surrounded over the entire circumference by a sheath of ionized gas so that striking of the primary arc is facilitated and welding is improved.

For carrying out the method according to the invention, use is made of a device comprising a welding torch with a housing which encloses a chamber and which is provided with a nozzle having a plasma orifice and at least one non-consumable electrode in the chamber, the said device furthermore comprising means for feeding a consumable electrode and two power supply sources which can be controlled independently of each other; according to the invention, this device is characterized by at least one complementary, non-consumable electrode, the two non-consumable electrodes being connected to the poles of the one power supply source, the consumable electrode being connected to one of the poles of the second power supply source, the other pole of which can be connected to a workpiece. Using the device according to the invention, workpieces can be welded failure-free in a programmed manner and in series so that the automation of the welding process is facilitated and the field of application is increased.

In a preferred embodiment of the device according to the invention, the complementary, non-consumable electrode has an annular construction and is arranged on the housing coaxially with respect to the plasma orifice and downstream from the nozzle. As a result of this construction and arrangement of the complementary electrode, the consumable electrode is optimally enveloped by the ionized gas flow during welding.

In another preferred embodiment of the device according to the invention, the nozzle is constructed as a complementary, non-consumable electrode. Because the nozzle acts as the complementary electrode of the secondary arc, a very compact construction of the welding torch is feasable.

A compact construction of the welding torch can alternatively be achieved in that in a further embodiment of the device according to the invention the complementary non-consumable electrode is arranged in the chamber.

The invention will be described in detail hereinafter with reference to the drawing.

FIG. 1 diagrammatically shows an embodiment of the device for performing the method according to the invention;

Figure 1:
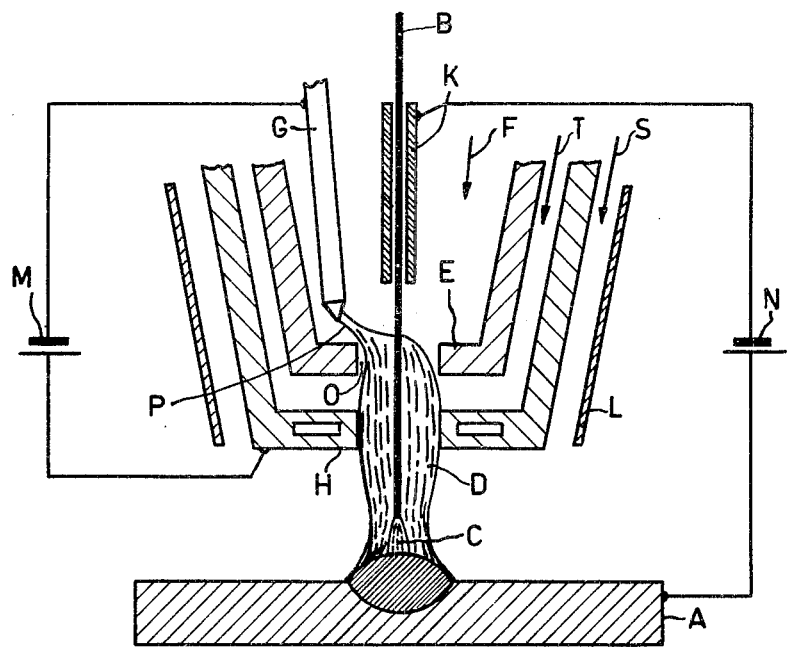

The method according to the invention will be described in detail hereinafter on the basis of the device which is diagrammatically shown in FIG. 1 and which comprises the elements which are necessary for performing the method. Between a workpiece A and a consumable electrode B a primary arc C is maintained in an ionized gas or auxiliary plasma D which is fed through the plasma orifice O of a nozzle E. The auxiliary plasma is generated by a secondary electric arc P which is maintained in a gas flow F, for example, argon, between two non-consumable auxiliary electrodes G and H; the auxiliary electrode G, made, for example, of tungsten, is arranged upstream from the nozzle E; the auxiliary electrode H has the shape of a water-cooled copper ring and is arranged between the nozzle E and the workpiece A. Both auxiliary electrodes G and H are connected to the poles of a first power supply source M, the consumable electrode B, via a contact tube K, and the workpiece A being connected to a second supply source N. The auxiliary plasma D is exclusively generated by the secondary arc between the two non-consumable auxiliary electrodes E and H and is independent of both the consumable electrode B and the workpiece A. A protective gas S, for example, a mixture of argon and carbonic acid gas, is supplied via a sleeve L. A flow T of protective gas can, moreover, be fed through the space between the nozzle E and the auxiliary electrode H. Using the device according to the invention, the primary arc can be interrupted without interruption of the secondary arc, and the primary arc subsequently can be struck again by means of the auxiliary plasma without a high-frequency discharge or a short-circuit contact between the consumable electrode and the workpiece being necessary.

Figure 2:
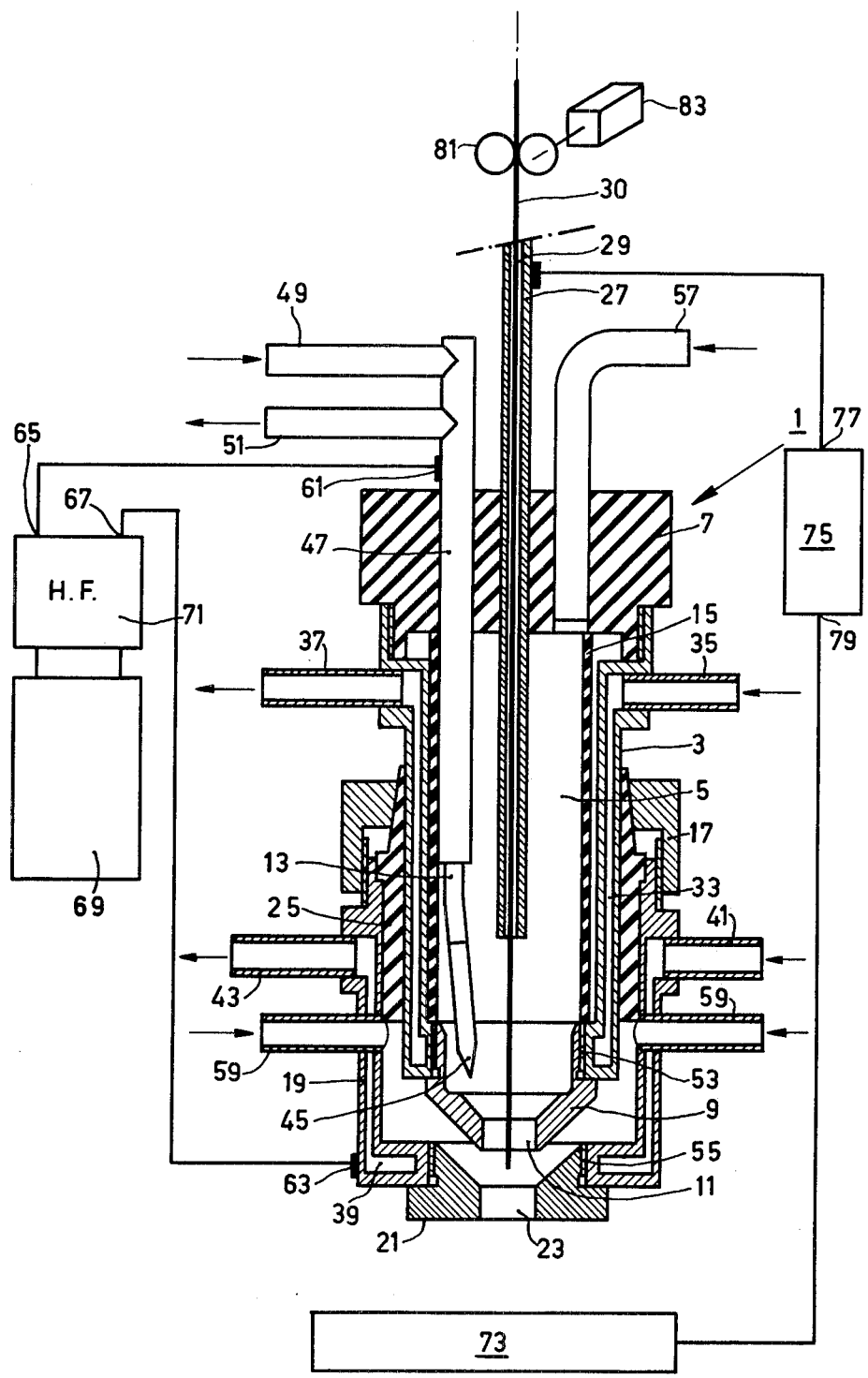
FIG. 2 shows a practical embodiment of the device according to the invention.

FIG. 2 shows a practical embodiment of the device according to the invention. This device comprises a plasma torch 1, composed by a plurality of parts, with a cylindrical housing 3 which encloses a chamber 5, the upper end of which is closed by a cover 7 which is made of an electrically insulating material. Arranged on the lower end of the housing 3 is a nozzle 9, which is provided with a plasma orifice 11. A rod-like non-consumable electrode 13 is secured in the cover 7 and is eccentrically arranged with respect to the plasma orifice 11 in the chamber 5. The inner wall of the chamber 5 is provided with an electrically insulating lining 15. A cylindrical sleeve 19 with a complementary, annular, non-consumable electrode 21, provided with an outlet opening 23, is secured on the housing 3 by means of a ring nut 17. The housing 3 and the sleeve 19 are electrically insulated with respect to each other by means of an annular insulating element 25. A guide and contact tube 27, secured in the cover 7 and comprising an axial boring 29 for guiding a welding wire 30, is centrically arranged in the chamber 5.

The housing 3 is of a double-walled construction and comprises a cooling jacket 33 with connections 35, 37; the sleeve 19 is provided with a cooling jacket 39 comprising cooling water connections 41 and 43 for the cooling of the electrode 21. The electrode 13 is preferably composed of two parts, i.e. the point-like end 45 which is to be loaded by the electric arc and which constitutes the actual electrode and is made of a high-melting metal, for example, tungsten, and the part 47 which acts as the electrode holder and which is made of a thermally properly conductive metal, for example, copper. The electrode holder 47 is preferably provided with cooling ducts (not shown) and connections 49 and 51 for the inlet and outlet of water. The nozzle 9 and the complementary electrode 21 are also made of copper. The nozzle 9 is connected to the housing by a screwed connection 53. The complementary electrode 21 is connected to the sleeve 19 in a similar manner by a screwed connection 55. The nozzle 9 and the complementary electrode 21 can thus be readily mounted and removed. The cover 7 is furthermore provided with at least one inlet tube 57 for a plasma gas. The sleeve 19 can, moreover, be provided with one or more connections 59 for the supply of a protective gas. Connection contacts 61 and 63 serve for the connection of the electrodes 13 and 21 to the poles 65 and 67 of a direct current supply source 69 via a high frequency generator 71.

The reference 73 denotes a workpiece. The welding wire 30 is connected, via the contact tube 27, to the pole 77 of a second independent direct current supply source 75, the other pole 79 of which is connected to the workpiece 73. The welding wird 30 can be fed by means of drive rollers 81 which are driven by a variable-speed motor 83.

The operation of the device is as follows: after the connection of the two non-consumable electrodes 13 and 21, the welding wire 30 and the workpiece 73 to the direct current supply sources 69 and 75 in the described manner, a plasma gas is supplied via the supply tube 57. In practice inert gases, argon, helium, hydrogen and nitrogen, and also mixtures thereof, are used as the plasma gas, whilst it is alternatively possible to utilize oxidizing gases if special electrodes are used. By way of a high-frequency discharge, a plasma arc is struck between the two non-consumable electrodes 13 and 21, the said arc being maintained in the gas flow by the power supply source 69. The auxiliary plasma generated by the plasma arc flows at a high speed through the plasma orifice 11 of the nozzle and through the outlet opening 23 of the complementary electrode 21 in the direction of the woripiece 73.

The welding wird 30 is fed through the boring 29 of the contact tube 27 into the auxiliary plasma in the direction of the workpiece, an arc also being struck and maintained between the welding wire and the workpiece. Because the end of the welding wire is completely enveloped by the auxiliary plasma, the primary arc between welding wire and workpiece can be struck without a high-frequency discharge or a short-circuit contact between welding wire and workpiece being required. When the workpiece is replaced, merely the primary arc needs to be interrupted, whilst the plasma arc is maintained without interruption. After another workpiece to be treated has been connected to the supply source 75, the primary arc is struck again by the auxiliary plasma. Welding is usually performed with the electrode 13 and the welding wird 30 connected to the negative poles of the direct current supply sources 69 and 75. However, the method according to the invention can alternatively be carried out with the electrode 13 and the welding wire 30 connected to the positive poles of the power supply sources or to an alternating current supply source for the secondary arc. By way of the connections 59 in the sleeve 19, a protective gas, the compositon of which may differ from that of the plasma gas, can be supplied in the usual manner so as to obtain adequate protection of the deposited material against oxidation. If desired, the weld can be further protected by an additional flow of protective gas. Besides the noble gases, also gases such as carbonic acid gas, gas mixtures of argon/oxygen, argon/helium, argon/oxygen/carbonic acid gas, and hydrogen and nitrogen can alternatively be used as the protective gas.

Figure 3:
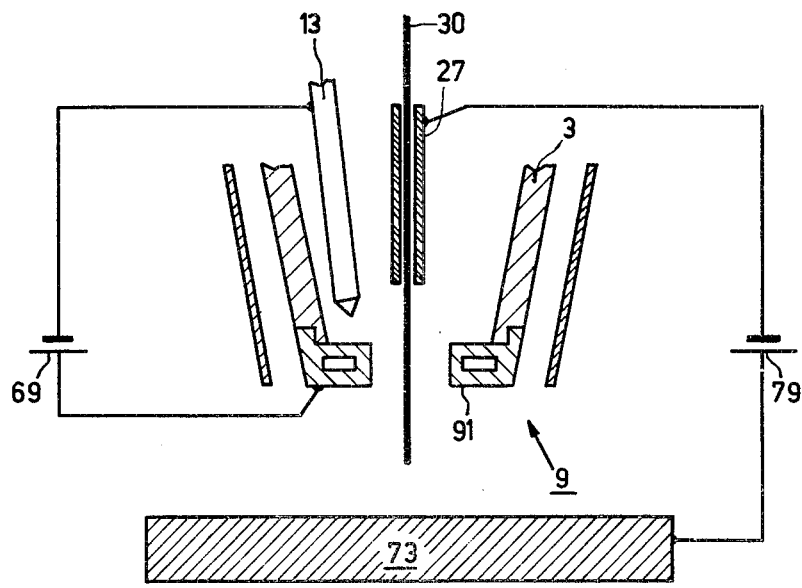
FIGS. 3, 4 and 5 show further embodiments of the device.
Figure 4:
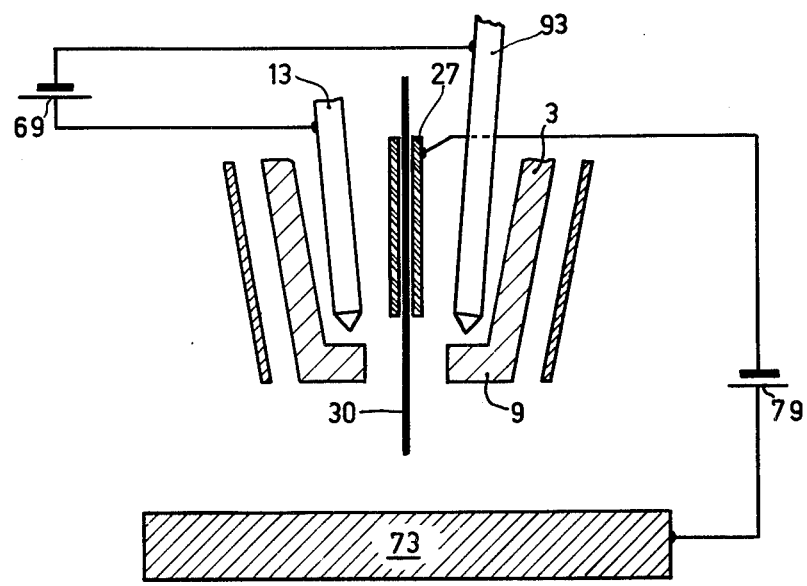
Figure 5:
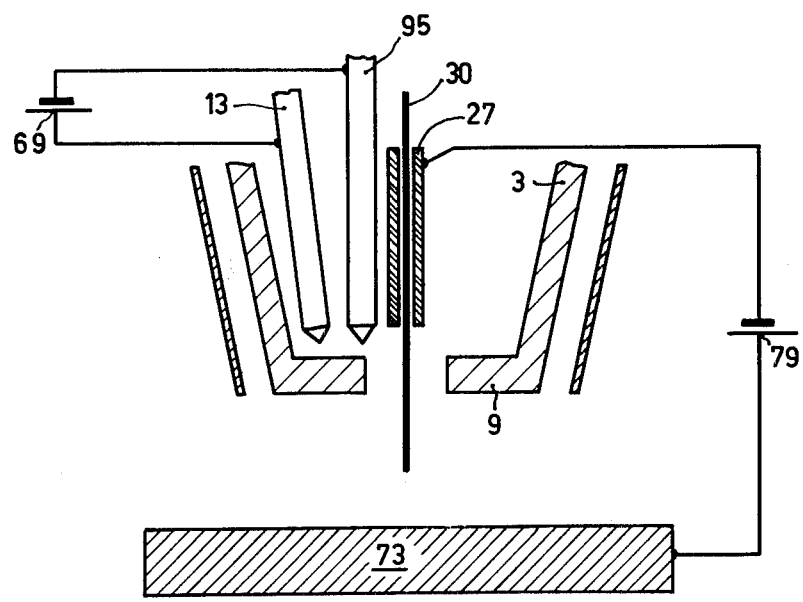

The FIGS. 3, 4 and 5 show further embodiments of the device according to the invention, identical elements being denoted by the same references.

In the device shown in FIG. 3, the nozzle 9 serves as the complementary, non-consumable electrode 91; for this purpose, the nozzle can be constructed as a water-cooled copper ring which is insulated with respect to the housing 3.

In the embodiment shown in FIG. 4, the non-consumable complementary electrode 92 has a rod-like shape and is arranged in the housing 3 opposite to the non-consumable electrode 13.

FIG. 5 shows a final embodiment in which the complementary non-consumable electrode 95 is also arranged in the housing 3, but both non-consumable electrodes 13 and 95 are arranged on the same side with respect to the contact tube 27.

The drawing shows two separate power supply sources for the plasma arc and the primary arc. The two power supply sources preferably form part of a common control unit, both sources, however, being separately controllable.

The invention was described with reference to embodiments involving two non-consumable electrodes and one consumable electrode. It will be obvious that the method according to the invention can also be performed using more than two non-consumable electrodes as long as the non-consumable electrodes on the one side and the consumable electrode on the other side are independent of each other.

What is claimed is:

1. A method of arc welding, which comprises flowing a thermally ionizable gas past and within the region of two non-consumable electrodes horizontally spaced from each other and terminating in a horizontal plane establishing a secondary (plasma) arc solely between said two horizontally spaced non-consumable electrodes to initiate and sustain a plasma flow, feeding a consumable electrode between said two horizontally spaced electrodes and through said plasma flow toward a workpiece, and separately and independently establishing a primary (MIG) arc solely between said consumable electrode and the workpiece.

2. A method according to claim 1, in which the plasma flow concentrically surrounds the end portion of the consumable electrode.

3. Apparatus for arc welding, which comprises a welding torch provided with two non-consumable electrodes horizontally spaced from each other and terminating in a horizontal plane, means for flowing a thermally ionizable gas past and within the region of said two horizontally spaced non-consumable electrodes, a first circuit means including said two horizontally spaced non-consumable electrodes and a first power supply for establishing a secondary (plasma) arc solely between said two horizontally spaced non-consumable electrodes to initiate and sustain a plasma flow, means for feeding a consumable electrode between said two horizontally spaced electrodes and through said plasma flow toward a workpiece, and second circuit means including said consumable electrode, a second power supply, and said workpiece for separately and independently establishing a primary (MIG) arc solely between said consumable electrode and said workpiece.

* * * * *